United States Patent [19]
van Hoff et al.

[11] Patent Number: 5,959,623
[45] Date of Patent: *Sep. 28, 1999

[54] SYSTEM AND METHOD FOR DISPLAYING USER SELECTED SET OF ADVERTISEMENTS

[75] Inventors: Arthur A. van Hoff, Mountain View; James A. Gosling, Woodside, both of Calif.

[73] Assignee: Sun Microsystems, Inc., Palo Alto, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/569,807

[22] Filed: Dec. 8, 1995

[51] Int. Cl.$^6$ .................................................. G06F 15/00
[52] U.S. Cl. ........................... 345/333; 345/357; 345/329
[58] Field of Search .................................... 345/302, 328, 345/329, 332, 335, 339, 340, 356, 357; 395/200.33, 200.49, 200.47

[56] References Cited

U.S. PATENT DOCUMENTS

| | | | |
|---|---|---|---|
| 5,297,249 | 3/1994 | Bernstein et al. | 345/356 |
| 5,347,632 | 9/1994 | Filepp et al. | 395/200.32 |
| 5,395,243 | 3/1995 | Lubin et al. | 345/340 |
| 5,481,666 | 1/1996 | Nguyen et al. | 345/357 |
| 5,572,643 | 11/1996 | Judson | 707/531 |
| 5,625,781 | 4/1997 | Cline et al. | 345/335 |
| 5,682,511 | 10/1997 | Sposato et al. | 345/353 |

OTHER PUBLICATIONS

Ken Thompson, "Regular Expression Search Algorithm," *Communications of the ACM,* Jun. 1968, vol. 11, No. 6, pp. 419–422.

Kin–Man Chung and Herbert Yuen, "A 'Tiny' Pascal Compiler; Part 1: The P–Code Interpreter," *BYTE Publications, Inc.,* Sep. 1978.

Kin–Man Chung and Herbert Yuen, "A 'Tiny' Pascal Compiler; Part 2: The P–Compiler," *BYTE Publications, Inc.,* Oct. 1978.

Gene McDaniel, "An Analysis of a Mesa Instruction Set," *Association for Computing Machinery,* May 1982.

Kenneth A. Pier, "A Retrospective on the Dorado, A High–Performance Personal Computer," *IEEE Computer Society, 10th Annual Intl. Symposium on Computer Architecture,* 1983, pp. 252–269.

James G. Mitchell, et al., "Mesa Language Manual," *Xerox Corporation, Palo Alto Research Center.*

Primary Examiner—Raymond J. Bayerl
Assistant Examiner—Cao H. Nguyen
Attorney, Agent, or Firm—Gary S. Williams; Pennie & Edmonds LLP

[57] ABSTRACT

A method and apparatus for displaying user selectable advertising information or other user selectable informational images on a host computer. In a preferred embodiment, a user accessing the World Wide Web via a browser application is concurrently displayed user selectable advertising information on a predefined portion of the host computer screen. In this embodiment, an advertising application is executed concurrently with the browser application. The advertising application is an object oriented program that includes a data structure for storing methods and data pointers. The methods define the creation of the dedicated portion of the user screen display for displaying the advertising information, methods for selecting the particular information to be displayed, as well as methods for accessing additional information related to the displayed advertisement images. The data pointers point to the particular advertising services, topical informational services or other services which have been selected by a user for display. In the preferred embodiment, the advertising images are displayed at all times a user is logged onto the World Wide Web. In another embodiment, the user may turn on or off the informational images as desired.

26 Claims, 4 Drawing Sheets

SYSTEM AND METHOD FOR DISPLAYING USER SELECTED SET OF ADVERTISEMENTS

The present invention relates generally to distributed computer systems, and particularly to a system and method in which a user's computer displays a sequence of advertisements or other informational images, where the user selects topic areas or information sets of interest to the user.

BACKGROUND OF THE INVENTION

The distribution of advertising via computers is well established. For instance, advertising space on certain World Wide Web sites is sold much like advertising on television stations. Advertisers can buy advertisement space at a particular World Wide Web site, the rate set by the popularity of the site. This setup is similar in nature to advertisement space as sold in periodicals, radio or television. The more popular the underlying program or time slot, the more expensive the advertising rate. At World Wide Web sites, the space takes the form of either actual space on a given display page for a given site, where an advertiser may display various graphics or text relating to a product or service, or may be of the form of a hyperlink to another World Wide Web site which contains the advertisement information.

While advertising on the World Wide Web is known, there are problems unique to the Web for both the advertiser and the consumer. In the World Wide Web setting, advertisers are confronted with the difficult task of determining which sites are appropriate for their products or services. On the Web, advertisers aren't afforded the luxury of being able to pick a major network (like NBC or CBS) to place their ads. Accordingly, it is more difficult to reach a broad cross section of the population.

A second problem exists for advertisers and consumers alike relating to consumers who want information concerning particular products or services. One mechanism for advertising products or services is to create a World Wide Web site dedicated to an individual product or service. The "advertising site" can provide lots of helpful information to consumers and has the potential to boost sales. However, a custom Web site is only as effective as the ability of the advertiser to "advertise" the very existence of the site. This is because of the basic structure of the Web. While a user on the World Wide Web is certainly able to connect to any other site on the Web, the problem lies in knowing where to look. If a consumer doesn't know the exact address on the Web for the particular "advertising site", then it is often difficult if not impossible to find the site. So while an advertiser may have an informational page located somewhere on the Web, its effectiveness is minimized without an associated advertising campaign as to the existence of the very site.

Finally, from a consumer's perspective, one of the most disturbing aspects relating to advertising is the inability of the consumer to provide any control over the timing or the content of the advertisement information. Heretobefore, a consumer would log onto a site and was captive, subjected to the advertising whims of the site owner. Much like in a broadcast television setting, a consumer can switch channels (log off), but this is often a dissatisfying solution. While many consumers appreciate the advertisements, a system which allowed the consumer control over both the timing and the content would be well received.

Accordingly, it is the object of the present invention to provide consumers with the ability to control the timing and content of advertisement information while logged onto the World Wide Web.

It is a further object of the present invention to provide a user controllable advertising window for display advertising information or other user selectable information in conjunction with a browser application used to access sites on the World Wide Web.

SUMMARY OF THE INVENTION

In summary, the present invention is a method and apparatus for displaying user selectable advertising information or other user selectable informational images on a host computer. In a preferred embodiment, a user accessing the World Wide Web via a browser application is concurrently displayed user selectable advertising information on a predefined portion of the host computer screen. In this embodiment, an advertising application is executed concurrently with the browser application. The advertising application is an object oriented program that includes a data structure for storing methods and data pointers. The methods define the creation of the dedicated portion of the user screen display for displaying the advertising information, methods for selecting the particular information to be displayed, as well as methods for accessing additional information related to the displayed advertisement images. The data pointers point to the particular advertising services, topical informational services or other services which have been selected by a user for display. In the preferred embodiment, the advertising images are displayed at all times a user is logged onto the World Wide Web. In another embodiment, the user may turn on or off the informational images as desired.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENTS

Figure 1:
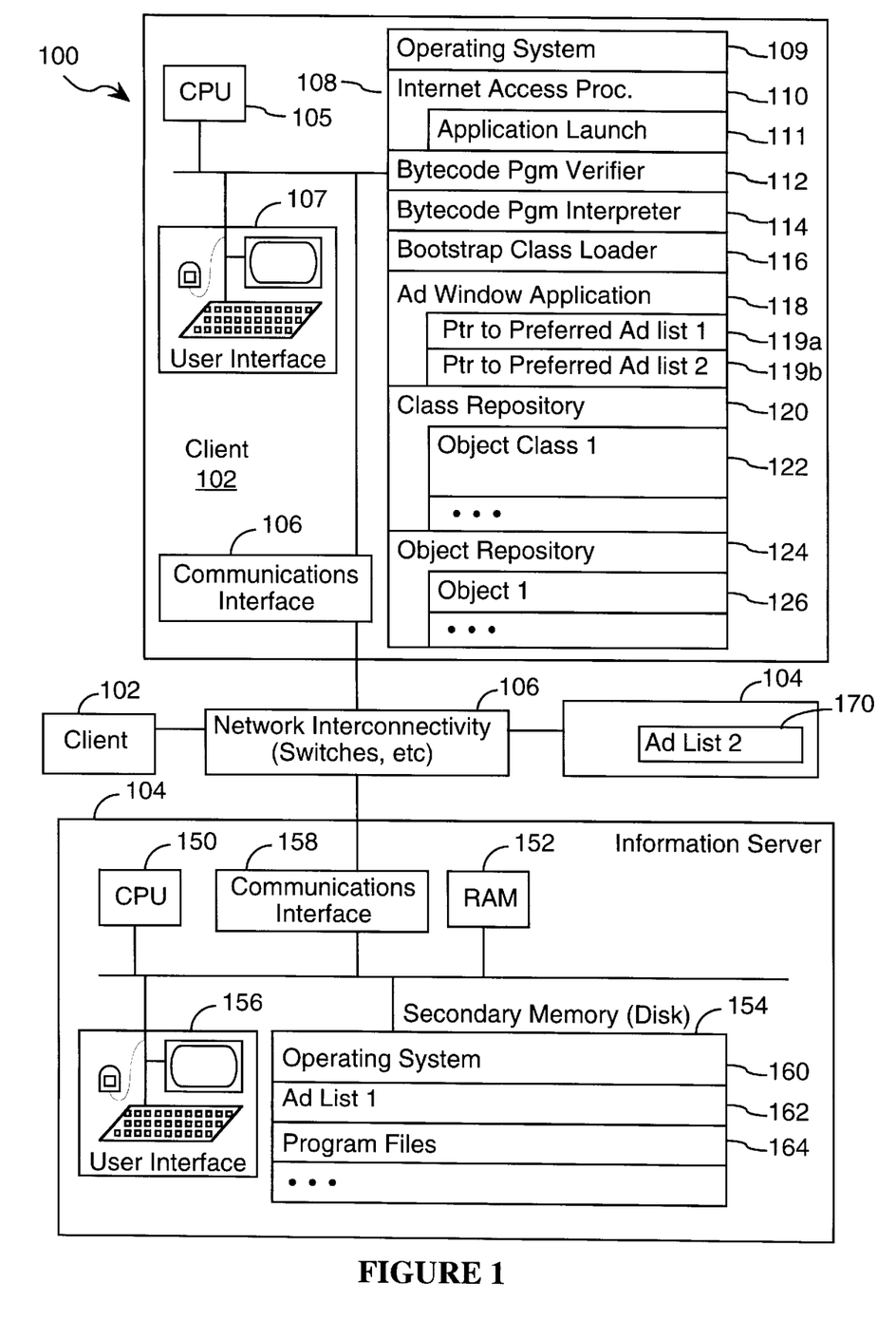
FIG. 1 is a block diagram of a distributed computer system incorporating the present invention.

Referring to FIG. 1, there is shown a distributed computer system 100 having many client computers 102 and at least one remotely located information server computer 104. In the preferred embodiment, each client computer 102 is connected to the information servers 104 via the Internet 103, although other types of communication connections could be used. While most client computers are desktop computers, such as Sun workstations, IBM compatible computers and Macintosh computers, virtually any type of computer can be a client computer. In the preferred embodiment, each client computer includes a CPU 105, a communications interface 106, a user interface 107, and memory 108. Memory 108 stores:

an operating system 109;

an Internet communications manager program 110, including application launch method 111;

a bytecode program verifier 112 for verifying whether or not a specified program satisfies certain predefined integrity criteria;

a bytecode program interpreter 114 for executing application programs;

a bootstrap class loader 116, which loads object classes into a user's address space and utilizes the bytecode program verifier to verify the integrity of the methods associated with each loaded object class;

an Ad Window Application program 118 which includes a method and data pointers for displaying informational images on a portion of a client user's display 107, and has associated with it a user selected list of preferred advertising lists 119a and 119b, each of which is essentially a URL reference to a list of advertisements maintained by a corresponding advertisement provider;

at least one class repository 120, for locally storing object classes 122 in use and/or available for use by user's of the computer 102;

at least one object repository 124 for storing objects 126, which are instances of objects of the object classes stored in the object repository 120.

In the preferred embodiment the operating system 109 is an object oriented multitasking operating system that supports multiple threads of execution within each defined address space. Furthermore, in the preferred embodiment, the bytecode program verifier 112 and interpreter 114 are a Java program verifier and interpreter for working with Java language programs. Java is a platform independent language and technology marketed by Sun Microsystems, Inc. In addition, the Internet access procedure 110 in the preferred embodiment is the HotJava browser, and is embodied as a method in an associated object class that is stored in a local class repository 120 in the client computer's memory 108.

The bootstrap class loader 116 is typically invoked when a user first initiates execution of a procedure, requiring that an object of the appropriate object class be generated. The class loader 116 loads in the appropriate object class and calls the bytecode program verifier 112 to verify the integrity of all the bytecode programs in the loaded object class. If all the methods are successfully verified an object instance of the object class is generated, and the bytecode interpreter 114 is invoked to execute the user requested procedure, which is typically called a method. If the procedure requested by the user is not a bytecode program and if execution of the non-bytecode program is allowed (which is outside the scope of the present document), the program is executed by a compiled program executer (not shown).

The information server 104 includes a central processing unit 150, primary memory 152 (i.e., fast random access memory) and secondary memory 154 (typically disk storage), a user interface 156, a communications interface 158 for communication with the client computers 102 via the communications network 106. For the purposes of the present discussion, it will be assumed that the information server's secondary memory 154 stores:

an operating system 160, an advertising list data structure 162, and program files 164.

A second information server 104 is shown connected via the Network 106 which includes all of the above mentioned server hardware elements (not shown) and includes a secondary memory for storing a second advertising list data structure 170.

Figure 2:
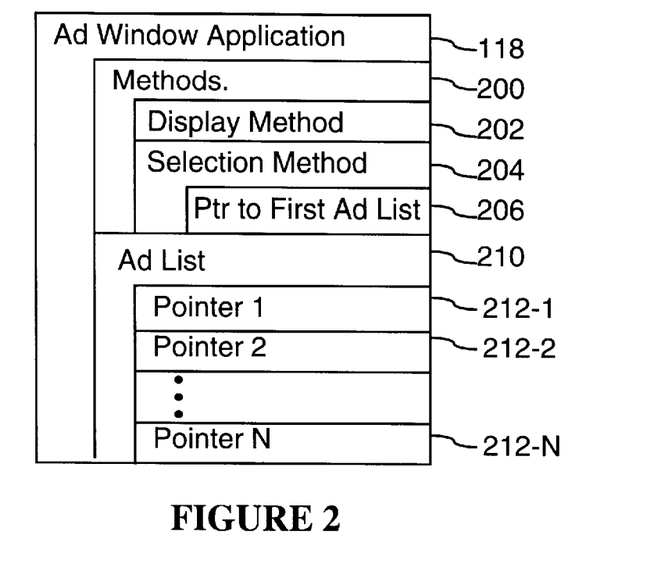
FIG. 2 is a block diagram of a data structure for an Ad Window application according to one embodiment of the present invention.

Referring now to FIG. 2, the data structure associated with the Ad Window application program is shown. In the preferred embodiment, the Ad Window application program is a bytecode program written in the Java programming language. The Ad Window application includes methods 200 and a user established list 210 of preferred advertising lists comprising a plurality of pointers 212-1 through 212-n associated with informational image lists which have been selected by the user.

The methods 200 include a display method 202 and a selection method 204. The display method 202 includes methods for dedicating a portion of the screen display of the client computer 100, as well as methods for displaying lists of informational images (Ad lists) in the dedicated space. The selection method 204 includes methods for selecting which informational image lists are to be displayed in the dedicated space as well as other operational parameters (timing, sequencing, and the like) associated with the displayed information. In the preferred embodiment, the selection method includes a pointer 206 to a first Ad list in the user established list 210 of preferred advertising lists.

For the purpose of this discussion, two data pointers 212-1 and 212-2 associated with informational image lists 162 and 170 are shown. The pointers 212-1 and 212-2 point to the location, in this case to the server computers 104, which contain the Ad lists which are to be displayed in conjunction with the execution of the Ad Window application program. Those ordinarily skilled in the art will recognize that more than two pointers may be utilized, indicating more than two lists to be displayed. The choice of two pointers and two lists should not be construed as limiting. In the preferred embodiment, the data pointers are set at the first execution of the Ad Window application program by the selection method 204, and thereafter may be changed as desired by the user by invoking the selection method to add or subtract data lists from the preferred list 210.

Figure 3:
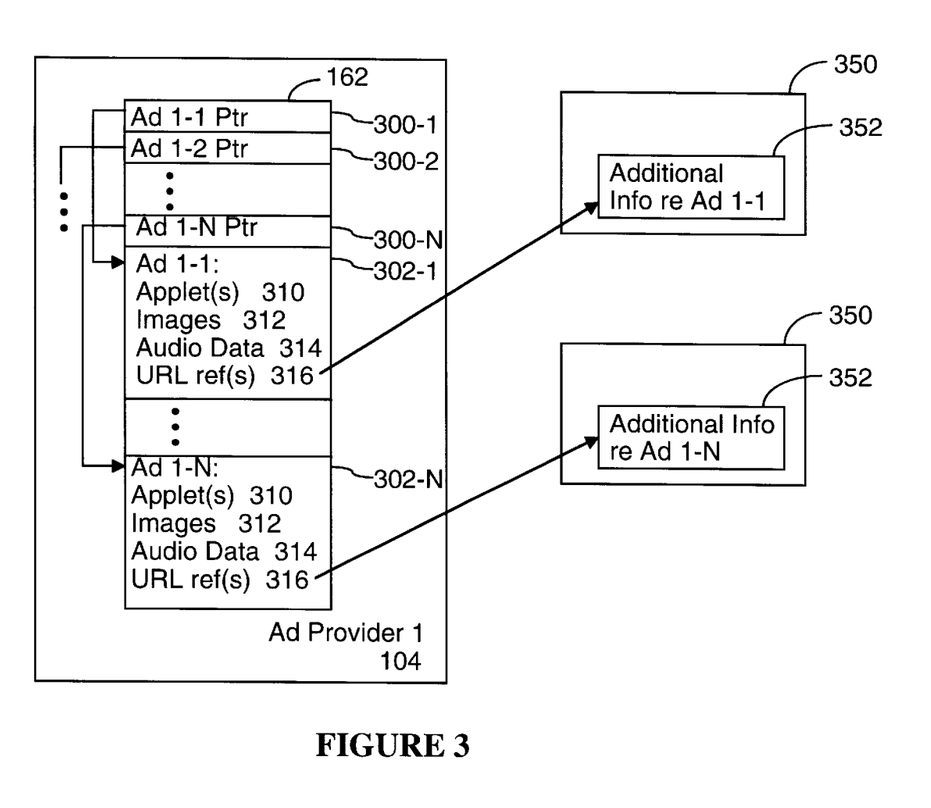
FIG. 3 is a block diagram of a data structure for an Ad List according to one embodiment of the present invention.

Referring now to FIG. 3, the data structure for Ad lists 162 and 170 according to one embodiment of the present invention is shown. Ad list 162 includes a plurality of pointers 300-1 through 300-n and associated advertisement programs 302-1 through 302-n.

In the preferred embodiment, each advertisement program 302 includes one or more applet(s) 310, images 312, audio data 314 and informational references 316.

Applet(s) 310 include methods for displaying the images 312 and any associated audio data 312 in the display window of the client computer. The applet(s) define the operational parameters associated with how long images are displayed, in what sequence, how they appear and disappear (fade or flash), as well as other display parameters if different from the default values set in the display method described above.

In the preferred embodiment, the images 312 are advertisements for products or services, and can include still pictures or video images. Audio data 314 includes voice, music or other audio signals for playback in coordination with the images 312.

In an alternative embodiment, the images 312 and audio 314 may be of any informational images, wholly unrelated to advertising. For example, other informational services including weather information, stock market services, news services or the like can provide the informational images and audio data. Similarly, information relating to travel, business, sports, education, self improvement, or other informational topics may be displayed in accordance with the present invention. It is anticipated that, as the Ad Window application disclosed herein gains wider acceptance, information service providers will organize lists of such information at centralized World Wide Web sites for selection and ultimate display by client users.

Informational references 316 include methods for locating additional information related to the subject matter displayed by the images 312 and addressed by the audio data 314. In the preferred embodiment, the informational references take the form of a URL which is linked to a World Wide Web site 350 which contains more information 352 related to the product or service images displayed. In this embodiment, the applet(s) 310 include a method for performing a URL fetch of the information 352 located at the remote site. In this way, the image data 312 may be limited to introductory or "teaser" information, which includes an easy link to more information if the reader is so inclined.

Alternately, the applets 310 for each advertisement or other informational program may use the associated informational references 316 (if any) to access remotely located information that is to be incorporated into the advertisement or informational message.

As was discussed above, the operating system 109 on the client computer 100 is an object oriented multitasking operating system that supports multiple threads of execution within each defined address space. In the preferred embodiment, at least two threads are executed concurrently, one associated with the HotJava browser application 110 and one associated with the Ad Window application 116, respectively.

As a first step to access or transfer information over the network 106, a client will initiate execution of the Internet access program 110 (HotJava). In the preferred embodiment, the bootstrap class loader 116 is invoked upon initiation of execution of the Internet access program 110, for generating an object associated with the Internet access program's object class. The class loader 116 loads in the Internet access program object class into the class repository 120 and calls the bytecode program verifier 112 to verify the integrity of all the bytecode programs in the loaded object class. If all the methods are successfully verified an object instance of the object class is generated and stored in the object repository 120, and the bytecode interpreter 114 is invoked to execute the user requested procedure, which in this case is the methods associated with the HotJava browser.

One such method associated with the HotJava browser 110 is an application launch method 111 which allows a user operating the browser to launch other applications for concurrent local execution on the client computer. The various other methods associated with the HotJava browser are not relevant and are not presented in any detail herein to avoid confusion with the present invention. Accordingly, for the purposes of this discussion, it is only required to understand that at least one of the methods associated with the browser allows for the launching of applications from within the browser for concurrent execution by the client computer 100.

Figure 4:
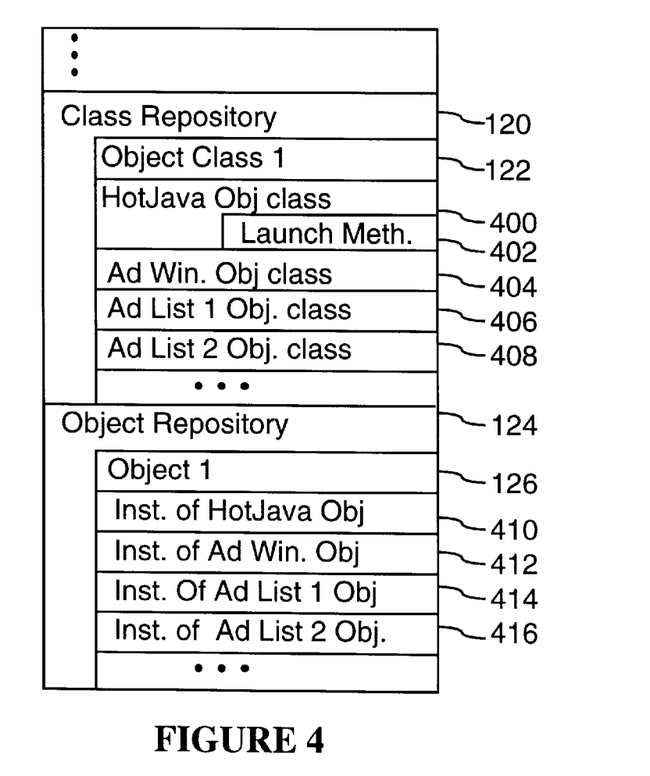
FIG. 4 is an expanded view of the secondary memory structure of a client computer shown in FIG. 1 after execution of a browser and Ad Window application according to one embodiment of the present invention.

FIG. 4 shows an exploded view of the secondary memory architecture of the client computer 100 after execution of the HotJava Internet access program 110. The secondary memory 108 includes HotJava object class 400 including launch method 402 stored within the class repository 120, as well as an instance of the object class 410 stored within the object repository.

Having successfully accessed the Internet (World Wide Web), a user wishing to access advertisement images will launch the Ad Window application 118 out of the browser for concurrent operation by the operating system 109 on the client computer 100. In order to do so, the user invokes the application launch method 202 associated with the browser object class. The application launch method 202 invokes the class loader 116, the Java verifier 112 and finally the Java interpreter 114 to execute the application program, the details of which are described below. In another preferred embodiment, the Ad Window application 118 is automatically launched by the HotJava browser program without requiring any user action.

The bootstrap class loader 116 creates a local copy of the object class associated with the user selected application program, herein the Ad Window application 118, and prepares the method or methods in that object class for local execution. Specifically, the bootstrap class loader 116 generates an object associated with the Ad Window program's object class. The class loader 116 calls the bytecode program verifier 112 to verify the integrity of all the bytecode programs in the loaded object class (Ad Window object class). If all the methods are successfully verified an object instance of the object class is generated and stored in the object repository 120.

Thereafter the bytecode interpreter 114 is invoked to execute the user requested procedure, which in this case is the methods associated with the Ad Window program. The bytecode interpreter 114 is a computer program that translates and executes instructions written in a programming language, such as programs written in the Java bytecode language. The translation process involves the conversion of each source language statement of a given computer program into machine language suitable for execution.

Figure 5:
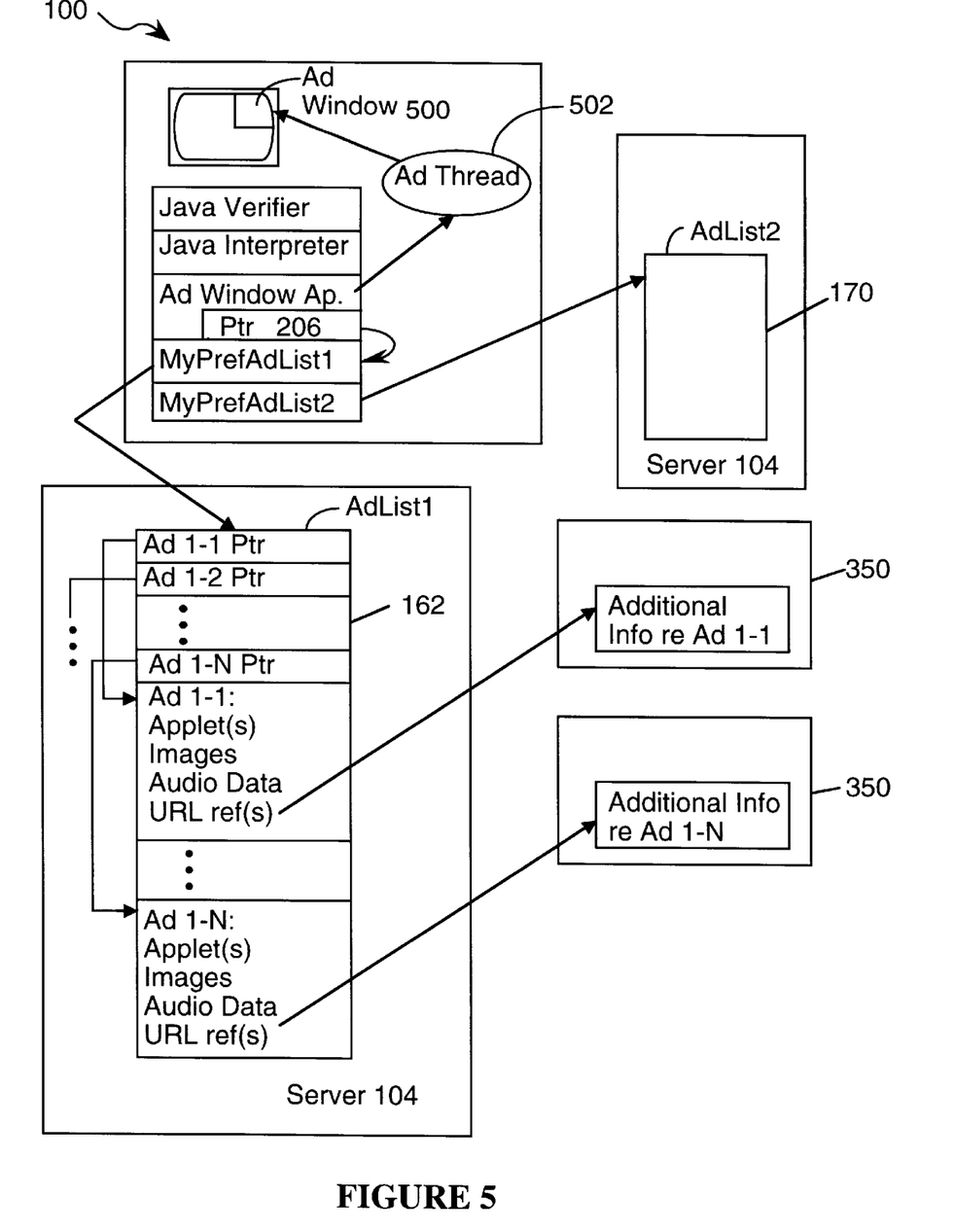
FIG. 5 is a block diagram showing the relationship between the various programming elements of the present invention required to present the advertising images in an ad window according to the present invention.

Referring now to FIG. 5, a block diagram is presented showing the relationship between the various elements of the Ad window application program, the Ad lists and reference sites according to one embodiment of the present invention. The figure will be utilized to highlight the relationships between the various elements in conjunction with the execution process by the bytecode interpreter 114 of the Ad Window program.

Upon a successful verification of the Ad Window application, the bytecode interpreter 114 executes the Ad Window application as a thread 502 in the multitasking operating system. Table 1 contains a pseudocode representation of the procedure performed by the Ad Window application. The interpreter will first execute the portion of the display method 202 associated with creating the Ad window 500 for displaying advertisement information. Thereafter, the interpreter 114 executes the selection method 204, locating the pointer 206 which indicates the first Ad list (in this case Ad List 1 (162)) in the list of preferred advertising lists 210 to be displayed.

The bytecode interpreter 114 will invoke the bootstrap class loader 116 to load the Ad List 1 application class as indicated by the pointer 206, creating a local copy of the object class associated with the Ad List 1 program. Specifically, the bootstrap class loader 116 generates an object associated with the Ad List 1 program object class. The class loader 116 loads in the Ad List 1 program object class into the class repository 120 and calls the bytecode program verifier 112 to verify the integrity of all the bytecode programs (applets in the Ad List 1) in the loaded object class (Ad List 1 object class). If all the methods are successfully verified an object instance of the object class is generated and stored in the object repository 120.

The interpreter repeats the above mentioned process for all Ad lists designated in the selection method to be displayed in the display window 500. Referring again to FIG. 4, an exploded view of the secondary memory architecture of the client computer 100 after execution of the Ad Window program 118 is shown. In the example recited above, the Ad window application program included in its list of preferred advertisement lists two entries for display Ad List 1 and Ad List 2. Accordingly, the secondary memory 108 as shown includes Ad Window object class 404, Ad List 1 object class 406, and Ad List 2 object class 408 stored within the class repository 120. In addition, instances of the Ad Window object class 412, Ad List 1 object class 414, and Ad List 2 object class 416 are shown stored within the object repository.

It should be understood that the applets in the advertisement entries may be as simple as a single line procedure call requesting the display of a specified image for a specified period of time, or calling for the display of a sequence of images with specified display durations for each of the images, where the Ad Window application includes standardized procedures for performing routine image, video and audio presentation tasks that can be invoked by the advertisement items. Other advertisement entries with more customized presentation requirements will include correspondingly more complex applets.

After the local load and verification of the Ad lists is performed, the interpreter executes the designated Ad lists in the order set out by the selection method 204 above. The execution process entails executing the various applet(s) for the Ad list designated. As described above, the applet(s) are methods for displaying the images and accompanying audio provided in the Ad list. The interpreter will display the images in the Ad window 500 providing the appropriate audio accompaniment, until the last image in the Ad list is reached. When the last image is reached, the interpreter will maintain the image displayed in the Ad window 500 for the designated time period, then will terminate the execution of the Ad list application class.

After completing the execution of a given Ad list application class, the interpreter looks to the selection method 204 to identify the next Ad list for display. In one embodiment, the same Ad list may be redisplayed upon reaching the last ad. In an alternative embodiment, a sequence of Ad lists is displayed. This process repeats until a user logs off from the World Wide Web. In an alternative embodiment, the user may turn off the Ad Window display by quitting the execution at any time during the execution process by the interpreter.

In the preferred embodiment, the loading of the object class associated with a given Ad list occurs only once prior to the initial execution of the methods for the Ad list object class. In an alternative embodiment, at each successive display for a given Ad list in a series of Ad lists, the bootstrap class loader is invoked to load the current Ad list application class from the remote server. In this way, the Ad window may display updated information during an ongoing logon session. In this embodiment, memory maintenance is performed to delete the old object class and instances of object classes from the class and object repositories as appropriate to free up memory resources upon the occurrence of a new load.

In an alternative embodiment, the Ad Window application is not a separate application, and instead may be embodied as a method embedded within the methods associated with the browser application 110. Accordingly, at the initiation of the browser application, the methods associated with the Ad Window application may be automatically executed.

In yet another alternate embodiment, the Ad Lists only contain data, in particular, images, video data and audio data, and information references to remotely located files containing images, video data and audio sound. In this embodiment there are no object classes associated with the Ad Lists, rather the Ad Window application determines from the data associated with each successive advertisement or informational item which of several predefined procedures is or are to be used to present the advertisement or information to the user. For instance, the Ad Window application in this embodiment will preferably include a first procedure for displaying a sequence of still images, a second procedure for displaying video data, and a third procedure for generating audio output from audio data, and those applications are automatically selected by the Ad Window application so as to properly present each item in the currently active Ad List.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

TABLE 1

Pseudocode Representation of Advertising Window Program

Procedure: AdWindow()
{
Establish a pointer to a first AdList in user established list of preferred
  advertising lists
Establish Advertising Window on User's Display
Do Forever
  {
  Establish link to Identified AdList
  Display each advertisement listed in the AdList for a default amount
    of time, unless the advertisement specifies a different time
    duration. Locally execute any applets associated with the
    currently displayed advertisement.
  When last advertisement in the identified AdList has been displayed,
    identify a next AdList (which may be the same as the previously
    used AdList if the User's set of AdLists contains only one entry).
  }
}

What is claimed is:

1. A computer-implemented method for displaying informational images on a display of a client computer concurrently while said client computer executes an end user application program, the method comprising the steps of:

(a) displaying images associated with said end user application program in a first portion of said client computer's display;

(b) accessing, at a location remote from said client computer, a list of informational image applications to be executed, each of said informational image applications including data and an applet for controlling the display of at least one image associated with said data;

(c) automatically identifying a first informational image application in said list;

(d) dedicating a second portion of said client computer's display to display images associated with said informational image applications in said second portion;

(e) automatically retrieving and executing said first informational image application such that said at least one image associated with said first informational image application is displayed in said second portion of said client computer display;

(f) automatically identifying a next informational image application to retrieve and execute in said list of informational image applications;

(g) automatically retrieving and executing said next informational image application and displaying at least one image associated with said next informational image application upon completing said executing of the informational image application prior to said next informational image application;

(h) automatically repeating said steps (f) and (g) until a last informational image application in said list of informational image applications is executed; and (i) performing said steps (e), (f), (g) and (h) while displaying both said images associated with said end user application program in said first portion and said images associated with said informational image applications in said second portion simultaneously.

2. The method of claim 1 wherein each informational image application is displayed for a predetermined time, the predetermined time being either a default time or a specified time for a particular informational image application, at least one of said informational image applications being stored on a server computer;

said step (e) displays said at least one image associated with said first informational image application for said predetermined time; and said step (g) displays said at least one image associated with said next informational image application for said predetermined time.

3. The method of claim 2 wherein said informational image applications include audio data for playing in conjunction with the displaying of said at least one image in said second portion of said client computer display.

4. The method of claim 2 wherein said image includes video images.

5. The method of claim 2 wherein said data includes an embedded reference to another location on said network which contains additional information related to said at least one image.

6. The method of claim 5 wherein said embedded reference is a URL designating an informational site located on the World Wide Web and where said applet includes a method for initiating a URL fetch to said informational site.

7. The method of claim 2 further including the steps of:

upon executing said last informational image application in said list of informational image applications, restarting from the top of said list and continuing to execute informational image applications and displaying images in said dedicated portion of said client computer display.

8. The method of claim 7 wherein said executing steps (e) and (g) include loading said informational image application including said data and said applet from a remote server to said client computer for execution.

9. The method of claim 8 further including the steps of;

upon each subsequent execution of an informational image application, reloading said data and applet associated with said informational image application from said remote server so as to receive timely updates, if any, of said data and applet.

10. The method of claim 2 wherein said step (i) performs said steps (e), (f), (g) and (h) until a user terminates the displaying of said informational image applications.

11. A computer-implemented method for displaying informational images on a portion of a display of a client computer concurrently while said client computer executes an end user application program, the method comprising the steps of:

(a) displaying images associated with said end user application program in a first portion of said client computer's display;

(b) accessing, at a location remote from said client computer, a list of informational items to be presented, each of said informational items including data for controlling the display of at least one image;

(c) automatically identifying a first informational item in said list;

(d) dedicating a second portion of said client computer's display to display images associated with said informational items in said second portion;

(e) automatically retrieving and presenting said first informational item such that said at least one image associated with said first informational item is displayed in said second portion of said client computer display;

(f) automatically identifying a next informational item to present in said list of informational items;

(g) automatically retrieving and presenting said next informational item and displaying at least one image associated with said next informational item upon completing said presenting of the informational item prior to said next informational item;

(h) automatically repeating steps (f) and (g) until a last informational item in said list of informational items has been presented; and (i) performing said steps (e), (f), (g) and (h) while displaying both said images associated with said end user application program in said first portion and said images associated with said informational items in said second portion simultaneously.

12. The method of claim 11 wherein each informational item is displayed for a predetermined time, the predetermined time being either a default time or a specified time for a particular informational item, at least one of said informational items being stored on a server computer;

said step (e) displays said at least one image associated with said first informational item for said predetermined time; and said step (g) displays said at least one image associated with said next informational item for said predetermined time.

13. The method of claim 12 wherein said informational items include audio data for playing in conjunction with the displaying of said at least one image in said second portion of said client computer display.

14. The method of claim 12 wherein said image includes video images.

15. The method of claim 12 wherein said data includes an embedded reference to another location on said network which contains additional information related to said at least one image.

16. The method of claim 15 wherein said embedded reference is a URL designating an informational site located on a remotely located server computer.

17. The method of claim 12 further including the steps of:

upon presenting said last informational item in said list of informational items, restarting from the top of said list and continuing to present informational items and display images in said dedicated portion of said client computer display.

18. The method of claim 17 wherein said executing steps (e) and (g) include loading said informational item including said data from a remote server to said client computer for execution.

19. The method of claim 18 further including the steps of;

upon each subsequent presentation of an informational item, reloading said data associated with said informational item from said remote server so as to receive timely updates, if any, of said data.

20. The method of claim 12 wherein said step (i) performs said steps (e), (f), (g) and (h) until a user terminates the displaying of said informational items.

21. A computer program product for use in conjunction with a computer system for displaying informational images on a display of said computer system, the computer program product comprising a computer readable storage medium and a computer program mechanism embedded therein, the computer program mechanism comprising:

instructions for accessing a list, located remotely from said computer system, of informational image applications to be executed, each of said informational image applications including data and an applet for controlling the display of at least one image associated with said data;

an informational image presentation procedure, including instructions for:
(a) automatically identifying a first informational image application in said list;
(b) dedicating a portion of said computer system display to display images associated with said informational image applications;
(c) automatically retrieving and executing said first informational image application such that said at least one image associated with said first informational image application is displayed in said dedicated portion of said computer system display;
(d) automatically identifying a next informational image application to execute in said list of informational image applications;
(e) automatically retrieving and executing said next informational image application and displaying at least one image associated with said next informational image application upon completing said executing of the informational image application prior to said next informational image application;
(f) automatically repeating execution of instructions (d) and (e) until a last informational image application in said list of informational image applications is executed; and
(g) executing instructions (c), (d), (e) and (f) while displaying both images associated an end user application in a first portion of the display and said images associated with said informational image applications in said dedicated portion simultaneously.

22. The computer program product of claim 21 wherein
each informational image application is displayed for a predetermined time, the predetermined time being either a default time or a specified time for a particular informational image, at least one of said informational image applications being stored on a server computer;
said instructions (c) include instructions that display said at least one image associated with said first informational image application for said predetermined time; and
said instructions (e) include instructions that display said at least one image associated with said next informational image application for said predetermined time.

23. The computer program product of claim 22 wherein said instructions (g) execute said instructions (c), (d), (e) and (f) until a user terminates the displaying of said informational image applications.

24. A computer program product for use in conjunction with a computer system for displaying informational images on a display of said computer system, the computer program product comprising a computer readable storage medium and a computer program mechanism embedded therein, the computer program mechanism comprising:

instructions for accessing a list, located remotely from said computer system, of informational items to be presented, each of said informational items including data for controlling the display of at least one image; and an informational item presentation procedure, including instructions for:
(a) automatically identifying a first informational item in said list;
(b) dedicating a portion of said computer system display to display images associated with said informational items;
(c) automatically retrieving and presenting said first informational item such that said at least one image associated with said first informational item is displayed in said dedicated portion of said computer system display;
(d) automatically identifying a next informational item to present in said list of informational items;
(e) automatically retrieving and presenting said next informational item and displaying at least one image associated with said next informational item upon completing said presenting of the informational item prior to said next informational item;
(f) automatically repeating execution of instructions (d) and (e) until a last informational item in said list of informational items has been presented; and
(g) executing instructions (c), (d), (e) and (f) while displaying both said images associated with an end user application program in a first portion of the display and said images associated with said informational items in said dedicated portion simultaneously.

25. The computer program product of claim 24 wherein each informational item is displayed for a predetermined time, the predetermined time being either a default time or a specified time for a particular informational image, at least one of said informational items being stored on a server computer;
said instructions (c) include instructions that display said at least one image associated with said first informational item for said predetermined time; and
said instructions (e) include instructions that display said at least one image associated with said next informational item for said predetermined time.

26. The computer program product of claim 25 wherein said instructions (g) execute said instructions (c), (d), (e) and (f) until a user terminates the displaying of said informational image applications.

* * * * *